Dec. 30, 1941.    M. B. MENTLEY    2,267,940
MACHINE TOOL
Filed Dec. 4, 1939

INVENTOR.
MAX B. MENTLEY
BY Whittemore, Hulbert
& Belknap
ATTORNEYS

Patented Dec. 30, 1941

2,267,940

UNITED STATES PATENT OFFICE 2,267,940

MACHINE TOOL

Max B. Mentley, Detroit, Mich., assignor to National Broach & Machine Company, Detroit, Mich., a corporation of Michigan Application December 4, 1939, Serial No. 307,503

7 Claims. (Cl. 82—33)

The present invention relates to a machine tool and more particularly to a machine tool having a rotary tool and a rotary work piece, one of which is power driven in rotation, and the other of which is intended to be mounted for substantially free rotation. I have illustrated my invention as applied to a rotary gear shaving machine of the type disclosed in application, Serial No. 90,401, in the name of Robert S. Drummond, entitled "Machine for cutting gears," filed July 13, 1936, Patent 2,157,981, May 9, 1939, for the reason that in this type of machine the accuracy of the result obtained depends in large part upon free rotational movement of either the gear or the tool.

In the past the spindle which supports the element mounted for free rotation has been provided with a conventional type of oil seal, and it has been found that the drag or friction developed by this type of seal is sufficient to introduce errors into the accuracy of the finished product. According to the present invention, I have completely eliminated the drag due to the oil seal, by providing a particular type of seal which I term a coolant slinger. This oil seal comprises essentially a pair of associated elements, one fixed on the support and one rotatable with the spindle or center. These elements cooperate to throw off the coolant and chips by centrifugal action, and to insure against admission of coolant or coolant-borne chips into the bearings supporting the spindle or center.

It is accordingly an object of the present invention to provide a novel oil seal which provides no friction drag to a rotatable element, and which prevents the admission of chips or coolant to the bearing.

It is a further object of the present invention to provide an oil seal of the novel type adapted to throw off coolant and chips by centrifugal action.

It is a further object of the present invention to provide an oil seal of the novel type characterized by an open passage leading to the bearing, the passage being provided with means preventing admission of chips or coolant therethrough.

It is a further object of the present invention to provide a gear finishing machine of the type referred to, in which either the gear or the tool spindle is mounted in antifriction bearings, protected from admission of chips by non-friction means.

Figure 1:
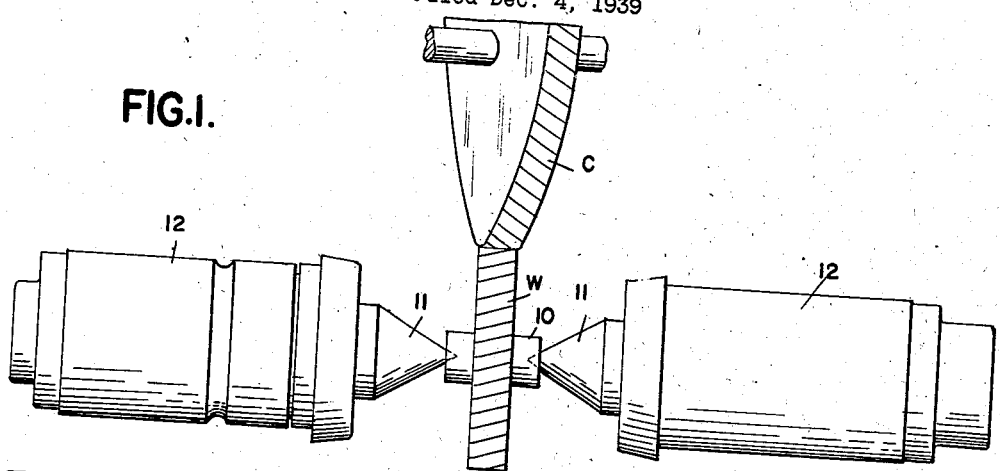
Figure 2:
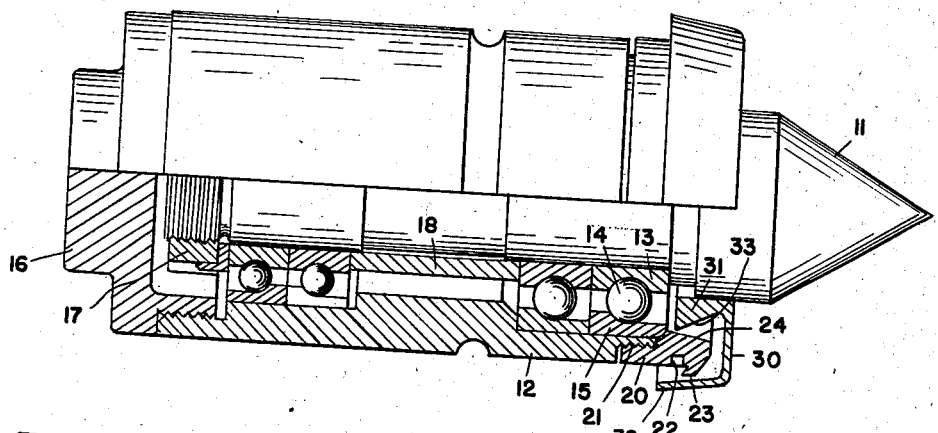
Figure 3:
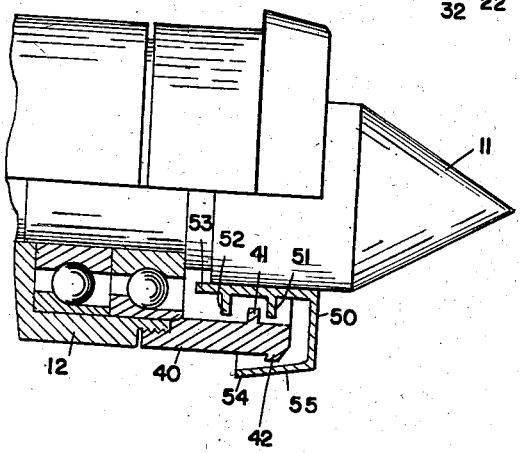

Other objects of the invention will be apparent as the description proceeds, and when taken in conjunction with the accompanying drawing, wherein:

In Figure 1 I have illustrated a set-up for shaving the surfaces of gear teeth;

Figure 2 is an enlarged side elevation partly in section of one of the spindle supports; and Figure 3 is a fragmentary elevation partly in section illustrating a somewhat different embodiment of my invention.

I have illustrated in Figure 1 the conventional set-up for machining the surfaces of gear teeth by employing a gear-like cutter in mesh with the gear to be finished at crossed axes. In this type of gear finishing the cutter is in the form of a gear-like member having serrations provided extending up and down the faces of the teeth and providing intermediate lands for cutting edges at the corners thereof. The helix angle of the cutter is selected with reference to the gear to be finished, such that the two may be meshed with their axes crossed at a limited angle. Due to the cross sliding motion introduced by the crossed axes setting, the surface of the gear tooth is shaved uniformly from top to bottom, and the finishing action is distributed from end to end of the gear teeth by an appropriate relative translation between the gear and tool.

In this type of gear finishing the cutter is carefully made to the desired shape within very small limits of accuracy. A cutter of known form will reproduce gear teeth of a complementary form on the gear. Due to the cutting action previously referred to, during operation either the cutter or the gear is positively rotated at a relatively high speed. In the present embodiment, I have illustrated a work gear W as in mesh with a cutter C, and the gear W is mounted for free rotation. Suitable means (not shown) are provided for rotating the cutter. Since the gear W is mounted for free rotation, it will be apparent that rotation will be determined by the meshing engagement of its teeth with the teeth of the cutter C. During the cutting operation the gear and cutter are maintained with their axes rigidly spaced, so that the translation referred to above will result in finishing the teeth of the gear to predetermined dimensions. The accuracy of the final result will therefore, as will be obvious, depend in large part upon freedom of rotation of the work piece.

In the past the element which is mounted for free rotation (normally the work gear) was mounted between centers which were provided with suitable antifriction bearings, preferably ball bearings of a conventional type. The cutting operation previously referred to results in the formation of very fine chips and slivers, and it is, of course, necessary to insure against admission of these chips into the bearings. So far as I am aware, this means for preventing admission of the chips into the bearings in the past, has always taken the form of a conventional oil seal having packing therein, which results in a considerable drag on rotation of the work spindle or centers. The amount of this drag is not important in ordinary machining operations, but in the present operation where limits of accuracy are maintained within a few ten-thousandths of an inch, it has been found that this drag is of considerable importance. My experiments have demonstrated that by employing a seal of the type disclosed in the present application, results are substantially improved. There is also, of course, the secondary advantage in the reduction of the power necessary.

In Figure 1 I have shown the work piece W as mounted on or provided with a shaft 10 which is supported between centers 11. The centers 11 are mounted in sleeves 12, which are carried by a suitable part of the machine. Normally sleeves 12 are mounted on a work carriage which is translated in a plane parallel to the axis of the tool, and in a direction oblique to the axis of the tool.

Referring now to Figure 2, I have illustrated the improved spindle assembly in an enlarged view. The center 11 is shown as provided with inner races 13 associated with ball bearings 14. Outer races 15 are provided in the sleeve 12, which is illustrated as closed at its rear end by a cap 16. The center 11 is provided at its rear end with a ring 17 which retains the inner races 13 in assembled position. A spacer 18 is provided intermediate the races at opposite ends of the center.

In order to prevent the admission of chips and coolant to the ball bearings, I provide an assembly which comprises the annular members 20 and 30.

The member 20 is provided with internal threads 21 adapted to engage the externally threaded forward end of the sleeve 12. Suitable recesses, such as 22, may be provided for the purpose of tightening the annular member 20 on the sleeve 12 with a suitable tool. The forward projecting end of the member 20 is provided with a generally outwardly and somewhat rearwardly projecting flange 23. The interior surface of the member 20 is tapered so as to incline outwardly and forwardly, as indicated by the numeral 24.

The annular member 30 is supported on the center 11 and preferably is made of a size so that it may be secured thereon by a press fit. The member 30 is provided with an inner rearwardly extending flange 31 and an outer rearwardly extending flange 32. The inner rearwardly extending flange 31 is provided with a rearwardly and outwardly tapered surface 33. The outer flange 32 also tapers outwardly and rearwardly.

It should be noted that the flange 23 is spaced a slight distance from the outer flange 32 of the member 30, and in like manner the rear corner of the inner flange 31 is spaced slightly from the forwardly projecting portion of the annular member 20.

As will be evident, the member 20 is fixed during operation of the device, and the member 30 rotates with the center 11. Rotation of the member 30 causes coolant and chips on the member to be cast off by centrifugal action. The outer flange 32 being inclined rearwardly and outwardly, as shown in the figure, assists materially in throwing off coolant from this member. The member 23 provides a baffle in the passage intermediate the members 20 and 30 and prevents the passage of chips therepast. Any coolant which passes the flange 23 and which reaches the outer surface 33 of the inner flange 31 is again cast off by centrifugal action to the inclined inner surface 24 of the member 20. The member 20 being stationary, this oil or coolant drains off onto the inner surface of the outer flange 32, whence it is cast off by centrifugal action. It will also be noted that the proximity of the corner of the inner flange 31 to the inner surface 24 of the member 20 again insures against passage of chips therepast. It will also be observed, of course, that the members 20 and 30 are out of contact with each other so that there is no frictional drag therebetween.

I have illustrated in Figure 3 a somewhat different embodiment of my invention, in which a projection 40 is threaded onto the forward end of the sleeve 12, and in which the seal 50 of somewhat different form is in press fit rotation with the rotatable center 11. The member 40 is similar in all respects to the member 20 previously described, except that it is provided with an internally extending radial flange 41. In Figure 3 the element 40 is not illustrated as having an outwardly and forwardly tapered inner surface, such as 24 in Figure 2, although it will be evident that such may be provided if desired. The member 50 is similar to the member 30 illustrated in Figure 2, with the exception that it is provided with two outwardly radially extending flanges 51 and 52 on the outer surface of the inner rearwardly extending flange 53. The operation of this type of seal is substantially identical with that shown in Figure 2, the principal difference being that flanges 41, 51 and 52 provide a more completely baffled passage between the elements 40 and 50. The element 50 throws off the major portion of the coolant by centrifugal action, this coolant being thrown off principally from the corner 54 due to the outwardly and rearwardly formation of the outer flange 55. Entrance of chips is effectively prevented by means of the outwardly extending flange 42 on the member 40, and such coolant as passes the flange 42 and reaches the rearwardly extending flange 53 is again cast off by centrifugal action from flange 51. This fluid drains forwardly and is deposited upon the rotating inner surface of the outer flange 55, whence it is cast off by centrifugal action.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A sleeve, a spindle mounted in rotation in said sleeve and projecting therefrom, bearings between said sleeve and spindle, an annular member carried by the projecting portion of said spindle having radially spaced annular flanges facing said sleeve, a fixed annular member carried by said sleeve and projecting therefrom into the space between said flanges, the outer of said annular flanges being inclined outwardly.

2. A sleeve, a spindle mounted in rotation in said sleeve and projecting therefrom, bearings between said sleeve and spindle, an annular member carried by the projecting portion of said spindle having radially spaced annular flanges facing said sleeve, a fixed annular member carried by said sleeve and projecting therefrom into the space between said flanges, the outer of said annular flanges being inclined outwardly, said fixed annular member provided at its outer end with a radially projecting flange extending to close proximity to the outer flange.

3. A sleeve, a spindle mounted in rotation in said sleeve and projecting therefrom, bearings between said sleeve and spindle, an annular member carried by the projecting portion of said spindle having radially spaced annular flanges facing said sleeve, a fixed annular member carried by said sleeve and projecting therefrom into the space between said flanges, the inner of said flanges having a radially outwardly extending portion extending to close proximity to the inner surface of said fixed annular member and providing a baffle therewith.

4. A sleeve, a spindle mounted in rotation in said sleeve and projecting therefrom, bearings between said sleeve and spindle, a rotary annular shell fixed to said spindle, said shell having inner and outer radially spaced flanges extending rearwardly toward said sleeve, the outer of said flanges inclined outwardly and rearwardly to throw off coolant and chips by centrifugal action, a fixed annular member carried by said sleeve and extending into the space between said flanges, said inner flange having an inner surface outwardly and rearwardly inclined to throw off coolant to the inner surface of said fixed annular member, the inner surface of said fixed annular member being inclined outwardly and forwardly to drain off coolant received thereby.

5. A sleeve, a spindle mounted in rotation in said sleeve and projecting therefrom, bearings between said sleeve and spindle, a rotary annular shell fixed to said spindle, said shell having inner and outer radially spaced flanges extending rearwardly toward said sleeve, the outer of said flanges inclined outwardly and rearwardly to throw off coolant and chips by centrifugal action, a fixed annular member carried by said sleeve and extending into the space between said flanges, said inner flange having an inner surface outwardly and rearwardly inclined to throw off coolant to the inner surface of said fixed annular member, the inner surface of said fixed annular member being inclined outwardly and forwardly to drain off coolant received thereby, said fixed annular member having a radial flange extending within close proximity to but spaced from the inner surface of said outer flange.

6. A spindle structure characterized by the absence of friction-imparting oil seals, which comprises: a spindle housing, a spindle in said housing having a portion projecting forwardly from said housing, bearings in said housing supporting said spindle for rotation in said housing, a coolant and chip seal comprising a first annular element carried by said spindle and having radially spaced inner and outer flanges extending rearwardly from said spindle toward said housing and providing an annular space therebetween, a second annular element carried by said housing having a flange extending forwardly into said annular space, the inner one of said rearwardly extending flanges constructed and arranged to prevent rearward passage of coolant therepast and to throw coolant radially outward to the inner surface of said forwardly extending flange, the inner surface of said forwardly extending flange having a portion extending from a point adjacent said spindle to a second point forwardly of said first point and further removed from said spindle whereby coolant deposited on said surface drains forwardly and outwardly and is discharged to the inner surface of the outer one of said rearwardly extending flanges, said last surface tapering rearwardly and outwardly, whereby coolant is discharged outwardly therefrom by centrifugal action.

7. A spindle, a housing therefor, an annular element secured to said spindle having radially spaced flanges extending rearwardly toward said housing and defining an annular, rearwardly facing channel, a second annular element secured to said housing having a flange extending forwardly into said channel, the inner surfaces of said channel tapering rearwardly and outwardly, and the inner surface of the flange of said second element tapering forwardly and outwardly, there being running clearance between said elements.

MAX B. MENTLEY.